US011885413B2

United States Patent
Cattoor et al.

(10) Patent No.: US 11,885,413 B2
(45) Date of Patent: Jan. 30, 2024

(54) DIRECT DRIVE UNIT FOR A TRANSMISSION SYSTEM

(71) Applicant: Dana Belgium N.V., Flanders (BE)

(72) Inventors: Kurt Cattoor, Koolkerke (BE); Filip D. Schacht, Meulebeke (BE); Joachim Van Dingenen, Drongen (BE); Tommy Van Acker, Lievegem (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/296,308

(22) Filed: Apr. 5, 2023

(65) Prior Publication Data

US 2023/0250873 A1    Aug. 10, 2023

Related U.S. Application Data

(63) Continuation of application No. 17/650,211, filed on Feb. 7, 2022, now Pat. No. 11,649,893.

(51) Int. Cl.
| | | |
|---|---|---|
| *F16H 61/14* | (2006.01) | |
| *F16H 47/08* | (2006.01) | |
| *F16H 61/688* | (2006.01) | |
| *B60K 17/02* | (2006.01) | |

(52) U.S. Cl.
CPC ............ *F16H 61/143* (2013.01); *B60K 17/02* (2013.01); *F16H 47/085* (2013.01); *F16H 61/688* (2013.01); *F16H 2061/145* (2013.01)

(58) Field of Classification Search
CPC .............. F16H 61/143; F16H 61/688; F16H 2061/145; F16H 47/085; F16H 37/04; F16H 37/06; F16H 3/00–78; B60K 17/02
See application file for complete search history.

(56) References Cited

U.S. PATENT DOCUMENTS

| | | |
|---|---|---|
| 4,548,101 A | 10/1985 | Akashi et al. |
| 4,784,019 A | 11/1988 | Morscheck |
| 5,199,314 A | 4/1993 | Hutchison |
| 5,299,985 A | 4/1994 | Johnston |
| 5,957,799 A | 9/1999 | Kashiwase |
| 6,253,140 B1 | 6/2001 | Jain et al. |
| 9,097,329 B2 | 8/2015 | Viitasalo et al. |
| 9,874,279 B1 | 1/2018 | Guo et al. |
| 10,166,975 B2 | 1/2019 | Lahr et al. |
| 2009/0308064 A1 | 12/2009 | Busch |
| 2015/0321674 A1 | 11/2015 | Ohashi et al. |
| 2017/0343092 A1 | 11/2017 | Arhab et al. |
| 2018/0126838 A1 | 5/2018 | Yanagida et al. |

FOREIGN PATENT DOCUMENTS

EP    0110538 A2    6/1984

*Primary Examiner* — Tinh Dang
(74) *Attorney, Agent, or Firm* — McCoy Russell LLP (57) ABSTRACT

A torque convertor and direct drive unit arrangement and operating methods are provided herein. In one example, a prime mover may be configured to be coupled to a transmission via one of a torque convertor and a direct drive unit, the direct drive unit including a higher range clutch and a lower range clutch.

20 Claims, 5 Drawing Sheets

DIRECT DRIVE UNIT FOR A TRANSMISSION SYSTEM

CROSS REFERENCE TO RELATED APPLICATION

The present application is a continuation of U.S. Non-Provisional patent application Ser. No. 17/650,211, entitled "A DIRECT DRIVE UNIT FOR A TRANSMISSION SYSTEM", and filed on Feb. 7, 2022. The entire contents of the above-listed application are hereby incorporated by reference for all purposes.

TECHNICAL FIELD

The present disclosure relates to a direct drive unit and a torque convertor connected to a transmission system.

BACKGROUND AND SUMMARY

Certain powertrains include torque convertors. Typically, in-use, the torque convertors are coupled directly to an engine and transmission. Torque convertors have a comparatively higher input speed, lower output speed, and torque multiplication functionality. Hence, torque convertors are particularly useful during vehicle launch and pushing operations. However, after a certain amount of acceleration, the convertor's output speed may approach the input speed which reduces the torque multiplication while efficiency losses in the convertor persist. At a certain operating point, the convertor's torque multiplication functionality may become negligible. In order to improve efficiency of the system, during certain vehicle operating conditions, the engine may be directly connected to the transmission system via a direct drive unit.

One example approach to reduce efficiency loss in a torque convertor is shown by Arhab et al. in US 2017/0343092 A1. Therein, a hydrokinetic torque coupling device that has a lock-up clutch integrated therein is used to selectively lock the rotation of the torque convertor. Arhab's lock-up clutch, when closed, locks the rotation of a casing to a turbine of the torque convertor, such that the driven and drive shafts of the torque coupling device rotate in unison.

The inventors have recognized several drawbacks with Arhab's torque coupling device as well as other torque convertors. For instance, Arhab's torque convertor and other torque convertors are stiff and may generate undesirable amounts of noise, vibration, and harshness (NVH) during shifting transients. The inventors have therefore recognized that the system's lack of flexibility may diminish shifting performance.

In one example, the issues described above may be addressed by a system for a vehicle, comprising: a prime mover configured to be selectively coupled to a transmission via each of a torque convertor and a direct drive unit, the direct drive unit including a higher range clutch and a lower range clutch. In this way, by selectively decoupling the torque convertor, and using a direct drive unit with separate paths for vehicle speeds, efficiency of the transmission system may be improved.

To address at least a portion of the abovementioned issues, the inventors developed a direct drive unit to enable direct connection of the engine to the transmission system while the torque convertor is selectively disconnected. The direct drive unit may directly connect the engine to the transmission system via a drive (input) shaft. When the direct drive unit connects the engine to the transmission system, the torque convertor is decoupled from the engine via a disconnect clutch. The direct drive unit may include a first low speed path for connecting the transmission to the engine during lower speed vehicle operation and a second high speed path for connecting the transmission to the engine during higher speed vehicle operation. The transmission system may be a three speed transmission system including a forward gear and reverse gear.

In this way, by adding a direct drive unit and a disconnect mechanism for the torque convertor, it is possible to choose between a torque convertor mode of operation and a direct drive mode based on vehicle operating conditions. During conditions when efficiency loss at the torque convertor is increased, by selectively disconnecting the torque convertor and switching to operation in the direct drive mode, efficiency of the transmission system may be improved. The technical effect of including separate paths for lower speed operation and higher speed operation in the direct drive unit is that a plurality of gear options are available in the forward and reverse drive modes, based on vehicle speed. By adding the possibility of direct drive gear manipulation, the gear spread in the three-speed transmission may be reduced, thereby resulting in equally spaced and smaller gear sizes and lower gear speeds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
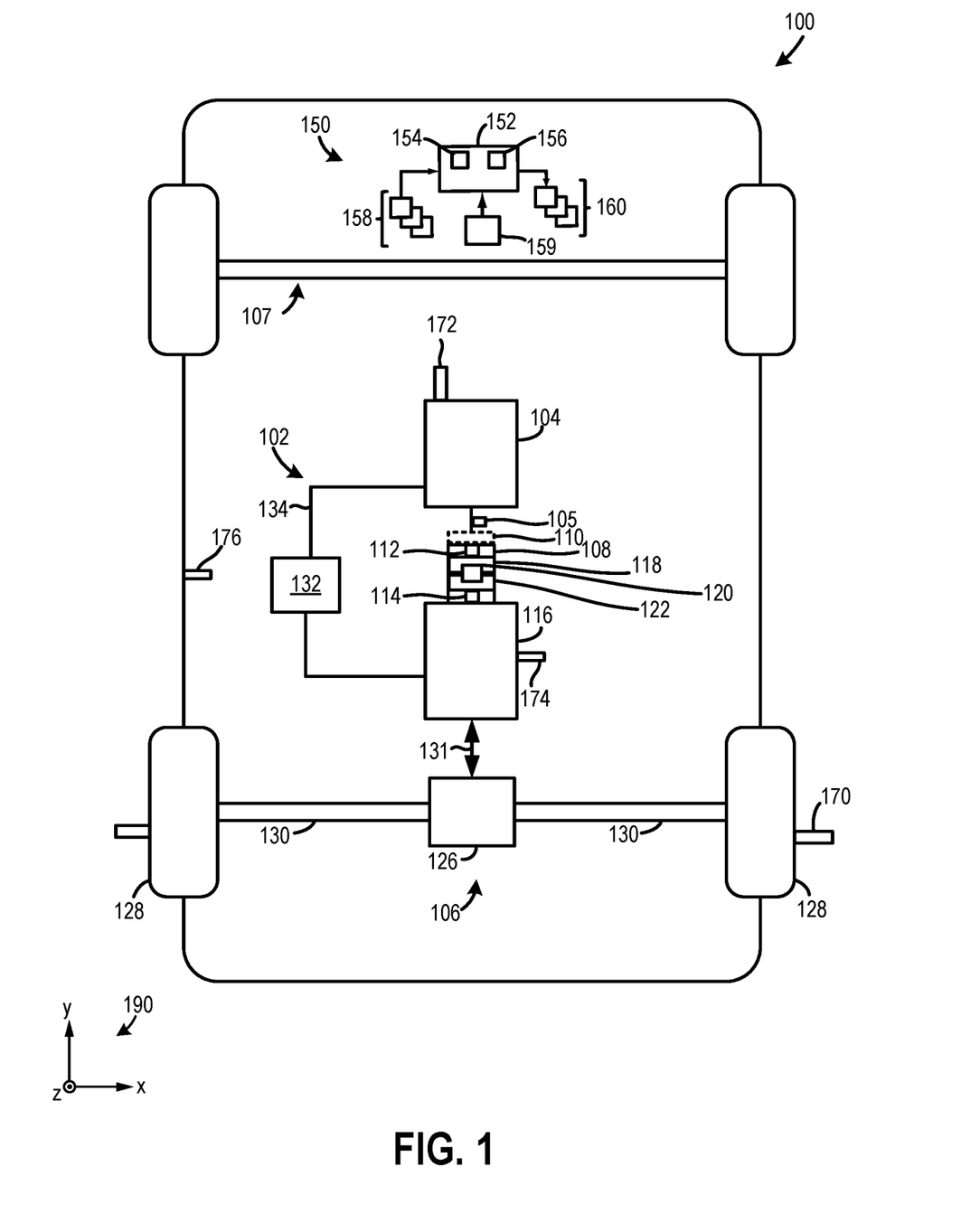
FIG. 1 is a schematic representation of a vehicle with a torque convertor and a direct drive unit.

The following description relates to systems and methods for a direct drive unit and a torque convertor connected to a transmission system. A vehicle powertrain including a direct drive unit and a torque convertor configured to couple an engine to a transmission system is shown in FIG. 1. The arrangement of gears and clutches in the direct drive unit and the transmission system is elaborated in FIGS. 2 and 3. The direct drive unit and the torque convertor may be operated based on vehicle operating parameters via a method of FIG. 4. An example of gear shift pathways possible with the direct drive unit and the torque convertor is shown in FIG. 5.

FIG. 1 shows a schematic depiction of a vehicle 100 with a powertrain 102 that includes a prime mover 104 (e.g., an internal combustion engine (ICE) designed for compression and/or spark ignition, an electric motor, combinations thereof, and the like). As such, the vehicle may be an ICE vehicle that omits an electric motor, in one example, or alternatively, may be an electric vehicle (EV) which forgoes the engine. Still further, in other examples, the vehicle may be a hybrid vehicle that includes both a motor and internal combustion engine. The vehicle 100 may include a drive axle 106 and a non-drive axle 107, although numerous axle arrangements have been envisioned.

The powertrain 102 may further include a torque convertor 108 that is rotationally coupled to the prime mover 104. A flexplate 110 may be used to form the rotational attachment between the prime mover 104 and the torque convertor 108. Alternatively, a flange connection may be used to attach the prime mover 104 to the torque convertor 108. The torque convertor 108 includes an input interface 112 and an output interface 114 that serve as attachment points for the prime mover 104 and a transmission 116, respectively. The interfaces in the torque convertor may be any suitable attachment mechanism such as plates, shafts, flanges, combinations thereof, etc.

The torque convertor 108 serves as a hydraulic coupling for power transfer between the prime mover 104 and the transmission 116 or vice versa. Specifically, the torque convertor may increase output torque during certain conditions. The torque convertor 108 may include an impeller 118, stator 120, turbine 122, and the like to achieve the aforementioned torque gains. The torque convertor 108 includes also include a lock-up clutch designed to engage and disengage based on powertrain operating conditions. When engaged, the lock-up clutch holds the input and output of the torque convertor at an equivalent rotational speed. Conversely, when disengaged, the lock-up clutch does not lock the input and output together and instead permits the torque convertor to operate as a torque multiplier. A torque convertor disconnect clutch 105 may be coupled between the prime mover 104 and the torque convertor 108 to selectively disconnect the engine from the transmission 116 via the torque convertor 108.

The prime mover 104 may be directly coupled to the transmission 116 via a direct drive unit 132 housed in a direct shaft 134 connecting the prime mover 104 to the transmission 116. An input shaft of the transmission 116 may connect each of the torque convertor 108 and the direct drive unit to the prime mover 104. The transmission 116 may include directional clutches and range clutches configured to be coupled to one of the torque convertor, a higher range clutch, and a lower range clutch of the direct drive unit 132. The directional clutches may include a forward clutch and a reverse clutch, and the range clutches include a first clutch, a second clutch, and a third clutch. The direct drive unit may be coupled to the input shaft between the directional clutches and the range clutches. The range clutches may be coupled to an output shaft of the transmission, the output shaft connecting the transmission to a differential 126. Details of the structure of the direct drive unit 132 along with the torque convertor 108 and the transmission 116 is elaborated in FIGS. 2-3.

At a vehicle start and when there is a higher than threshold desire for tractive effort, the engine may be connected to a transmission via a torque convertor. In response to a speed variance between two opposing rotational interfaces of the torque convertor (coupled to the engine and the transmission, respectively) being smaller than a threshold value, the torque convertor may be decoupled and the engine may be connected to the transmission via a direct drive unit including the higher range clutch and the lower range clutch. The higher range clutch may be connected to the input shaft during a higher than threshold vehicle speed condition and the lower range clutch may be connected to the input shaft during a lower than threshold vehicle speed condition.

The transmission 116 may be a powersplit, powershift, or hydrostatic type transmission, in different examples. The powershift transmission may be a transmission with friction clutches that are coordinated to reduce power losses during shifting transients. The powersplit transmission may be a transmission in which a mechanical branch and an electrical branch are coupled in parallel. The hydrostatic transmission may be a transmission with a hydraulic pump coupled to a hydraulic motor that jointly function to provide speed-torque conversion. The powertrain 102 may further include the differential 126 that is rotationally coupled to the transmission 116. The differential may also be connected to drive wheels 128 via axle shafts 130. Arrows 131 depict the power flow between the transmission 116 and the differential 126, during different operating conditions.

A control system 150 with a controller 152 may further be incorporated in the powertrain 102. The controller 152 includes a processor 154 and memory 156. The memory 156 may hold instructions stored therein that when executed by the processor cause the controller 152 to perform the various methods, control strategies, etc., described herein. The processor 154 may include a microprocessor unit and/or other types of circuits. The memory 156 may include known data storage mediums such as random access memory, read only memory, keep alive memory, combinations thereof, etc. The components of the controller may be collocated, in one example, or dispersed between multiple controller units, in alternate examples.

The controller 152 may receive vehicle data and various signals from sensors 158 positioned in different locations in the powertrain 102 and/or the vehicle 100. The sensors may include wheel speed sensors 170, a prime mover speed sensor 172, a transmission input speed sensor 174, an ambient temperature sensor 176, a lock-up clutch position sensor 178, and the like.

Further, the controller 152 may send commands to actuators 160 for component adjustment. For instance, the controller 152 may send control signals to an actuator of the torque convertor disconnect clutch 105. For example, when the torque convertor disconnect clutch 105 is hydraulically actuated, the controller may send commands to a hydraulic actuator (e.g., hydraulic valve) in fluidic communication with the torque convertor disconnect clutch 105. Responsive to receiving the command, the actuator may engage or disengage the torque convertor disconnect clutch 105. The controller may also send signals to the low speed and/or high speed direct drive clutches to engage/disengage one of them to couple the prime mover 104 directly to the transmission 116. The controller may further send control signals to the prime mover 104 to adjust the output speed. Still further, the controller may send signals to one or more actuators in the transmission that, in response, initiate a shift event to adjust the gear ratio. The shift signals may be automatically generated and therefore the transmission may be formed as an automatic transmission which automatically transitions between discrete gear ratios based on engine speed and load, for instance.

The control system 150 may include an input device 159 (e.g., an accelerator pedal, brake pedal, a control-stick, levers, buttons, combinations thereof, and the like). For instance, the input device 159 may allow the operator to generate a power request, a drive mode request in the case of an automatic transmission, a brake request, and the like.

An axis system 190 is provided in FIG. 1 for reference. The y-axis may be a vertical axis (e.g., parallel to a gravitational axis), the z-axis may be a lateral axis (e.g., a horizontal axis), and/or the x-axis may be a longitudinal axis, in one example. However, the axes may have other orientations, in other examples.

Figure 2:
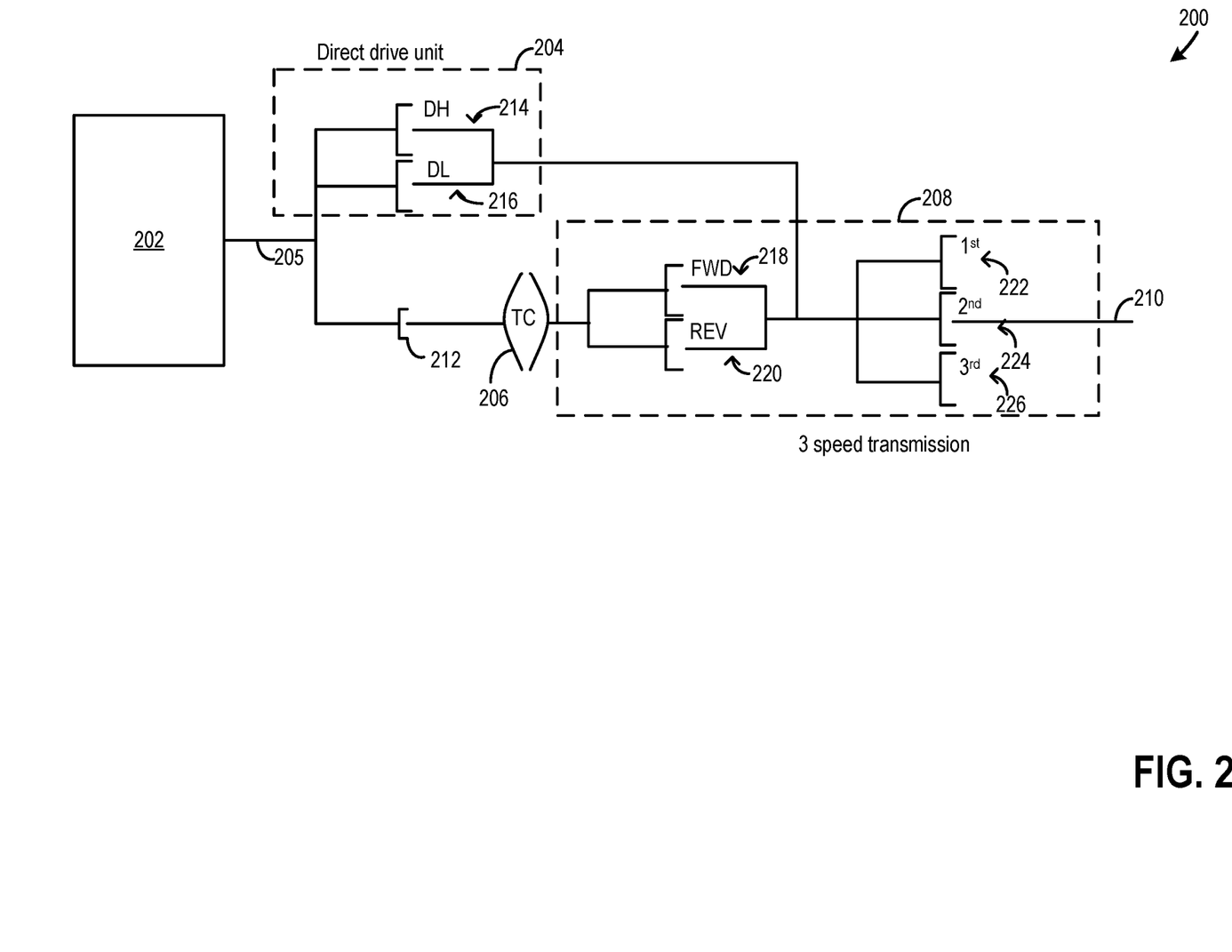
FIG. 2 depicts a first representation of the torque convertor and the direct drive unit.

Turning to FIG. 2, a first representation 200 of a torque convertor and a direct drive unit configured to connect a prime mover such as an engine to a transmission system is given. As an example, the engine 202 may be the prime mover 104 in FIG. 1, the direct drive unit 204 may be the direct drive unit 132 in FIG. 1, the torque convertor 206 may be the torque convertor 108 in FIG. 1 and the transmission 208 may be the transmission 116 in FIG. 1.

The engine 202 may be directly selectively connected to each of the torque convertor 206 and the direct drive unit via an input shaft 205. In alternate embodiments there may be two direct input shafts, one connecting the engine to the direct drive unit and the other connecting the engine to the torque convertor. The torque convertor 206 may be decoupled from the engine 202 by decoupling of a torque convertor disconnect clutch 212 positioned between the engine 202 and the torque convertor 206. When the torque convertor 206 is disconnected via the torque convertor disconnect clutch 212, the torque convertor 206 may stop rotating completely.

The direct drive unit 204 may include a higher range clutch (DH) 214 and a lower range clutch (DL) 216. Based on speed of operation of the vehicle, upon disconnection of the torque convertor 206, one of the DH 214 and the DL 216 may be connected to the transmission 208.

The transmission 208 may include a set of directional clutches including a forward clutch (FWD) 218 and a reverse clutch (REV) 220. The directional clutches may be connected to a set of range clutches including a first range clutch 222, a second range clutch 224, and a third range clutch 226. The directional clutches and the range clutches may be connected to an output shaft 210 of the transmission that transmits the power from the engine 202 to a differential and the vehicle axles. The direct drive unit 204 may be connected to the transmission 208 between the directional clutches and range clutches.

When the direct drive unit 204 is enabled and the torque convertor 206 is disabled, it is possible to connect each of three range clutches to each of the DH 214 and the DL 216 in each of the FWD 218 and the REV 220 direction. In this way, for each direction, it is possible to operate the transmission in six drive gears.

Figure 3:
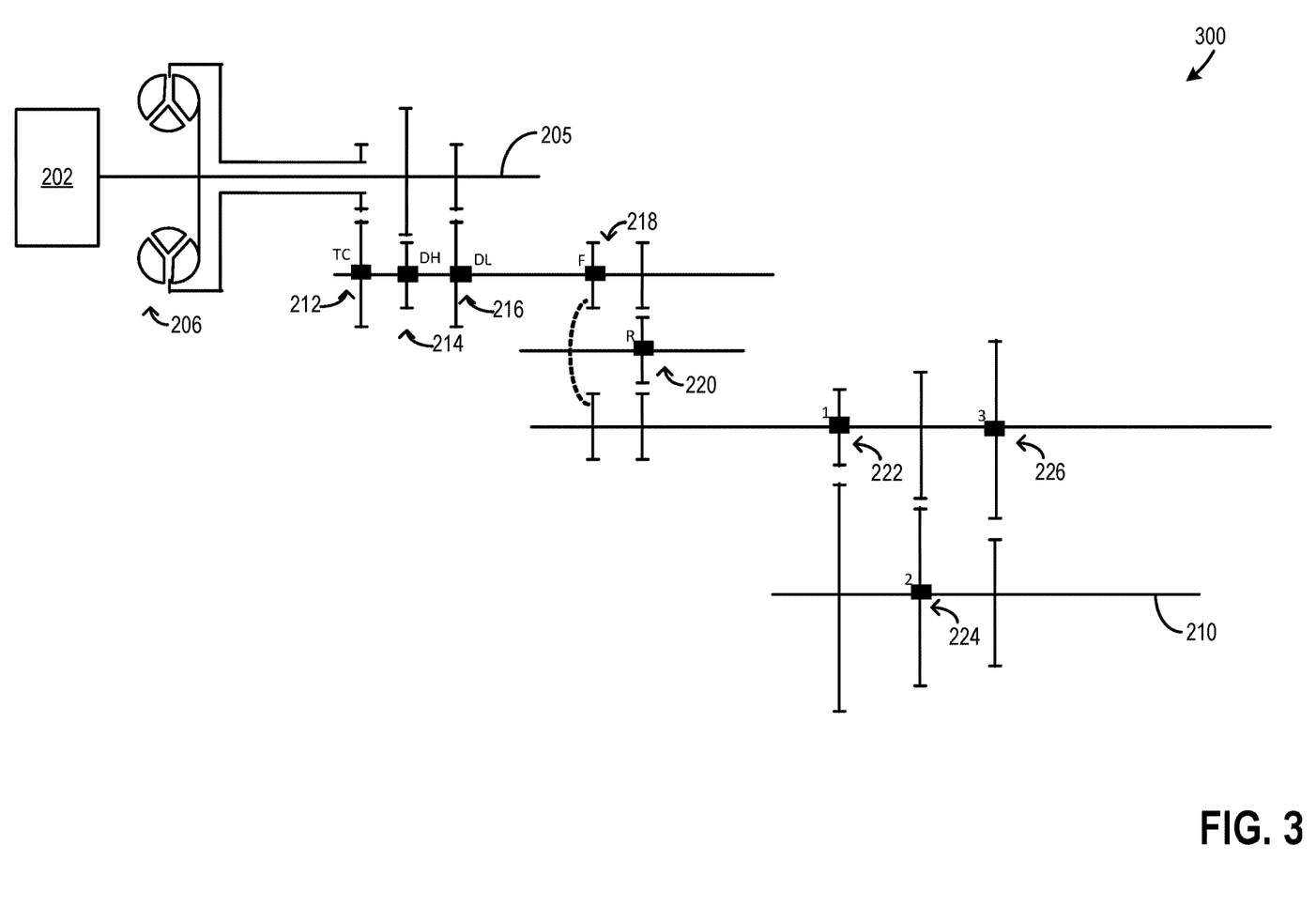
FIG. 3 depicts a second representation of the torque convertor and the direct drive unit.

A second representation 300 of the torque convertor and a direct drive unit configured to connect a prime mover such as an engine to a transmission system is given in FIG. 3. The second representation 300 shows the components previously introduced in the first representation 200. Redundant description is therefore omitted for concision.

The engine 202 may be connected to the torque convertor 206 and the direct drive unit via an input shaft 205. The torque convertor 206 may include a pump, a turbine, and a stator positioned coaxially. The torque convertor 206 may be selectively decoupled to the input shaft 205 via a torque convertor disconnect clutch (TC) 212. If the input shaft 205 is decoupled from the torque convertor 206 by decoupling the TC 212, one of the higher range clutch (DH) 214 and the lower range clutch (DL) 216 of the direct drive unit 306 may be coupled to the input shaft 205. Only one of the TC 212, DH 214, and DL 216 may be connected to the input shaft 205.

In this arrangement, each of the TC 212, DH 214, and DL 216 may be connected to directional clutches; a forward clutch (FWD) 218 and a reverse clutch (REV) 220. The directional clutches may in turn be coupled to one of the range clutches; a first a first range clutch 222, a second range clutch 224, and a third range clutch 226. The range clutches are connected to the output shaft 210. In this way, power may be transferred from the engine to the output shaft 210 via either the torque convertor 206, one of the directional clutches, and one of the range clutches, or via one of the DH 214 or DL 216, one of the directional clutches, and one of the range clutches. A method for operation of the torque convertor and the direct drive unit is shown in FIG. 4.

In this way, the components described in FIGS. 1-3 enable a system for a vehicle, comprising: an engine, a transmission including directional clutches and range clutches, a torque convertor configured to selectively connect the engine to the transmission via a disconnect clutch, and a direct drive unit configured to selectively connect the engine to the transmission via one of a higher range clutch and a lower range clutch.

Figure 4:
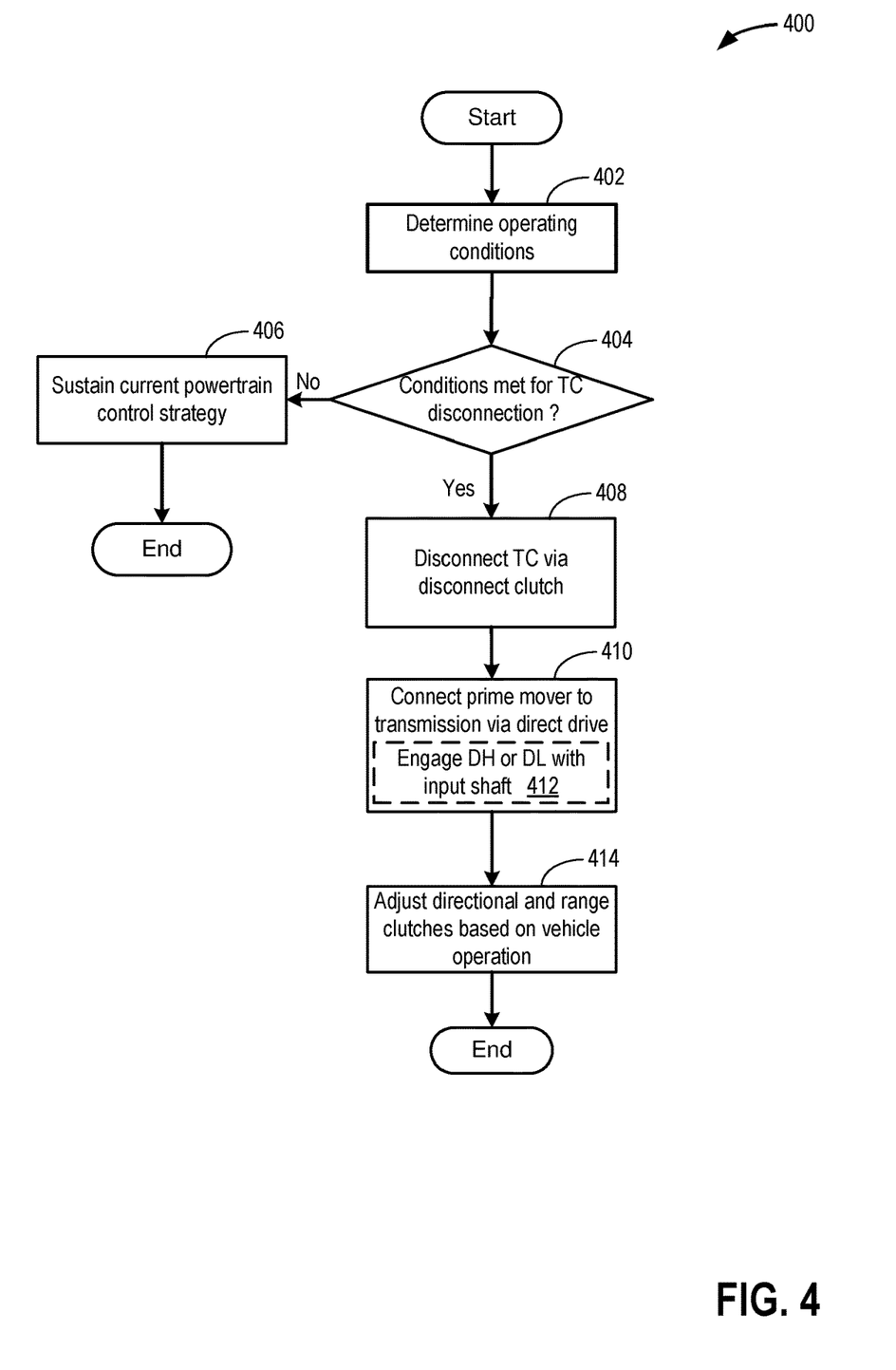
FIG. 4 depicts an operating method for the torque convertor and the direct drive unit.
Figure 5:
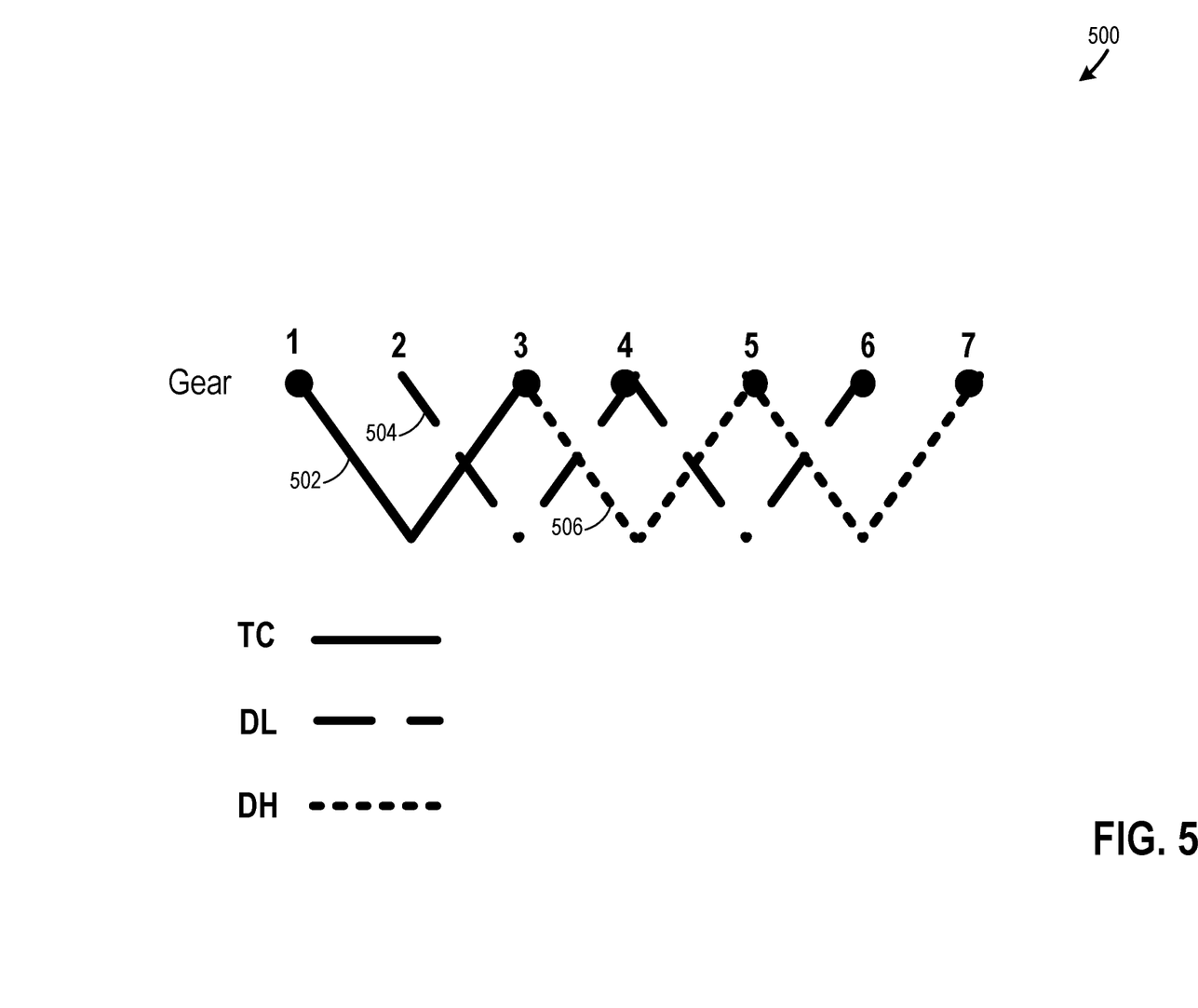
FIG. 5 depicts an example gear shift pathway involving the torque convertor and the direct drive unit.

FIG. 4 shows a method 400 for operation of a torque convertor (such as torque convertor 206 in FIG. 2) and a direct drive unit (such as direct drive unit 204 in FIG. 2) in a powertrain. In other examples, the method 400 may be implemented using other suitable torque convertors and direct drive unit. Further, the method may be carried out as instructions stored in non-transitory memory executed by a processor in a controller. As such, performing the method steps may include sending and/or receiving commands which trigger adjustment of associate components, as previously indicated.

At 402, the method includes determining operating conditions of the prime mover (engine and/or electric motor) and the vehicle. The operating conditions may include engine speed, motor speed, transmission speed, the torque convertor's input-output speed variance, vehicle speed, ambient temperature, road gradient, and the like. These operating conditions may be determined using sensor data and/or modeling algorithms.

At 404, the method includes determining if conditions are met for disconnecting the torque convertor (TC) from the engine. The torque convertor may be disengaged if the efficiency of the power transmission from the engine to the transmission is reduced and losses increase. The conditions for torque convertor disengagement may include torque convertor's input to output speed deviation being less than a threshold value. The threshold value may be pre-calibrated taking into account the torque convertors torque multiplication capabilities. For instance, the threshold value may be correlated to a point at which the convertor's torque multiplication functionality is negligible (e.g., substantially stops). The conditions for TC disengagement may include a lower than threshold desire for tractive effort. The threshold tractive effort may be pre-calibrated based on the vehicle and a surface of operation of the vehicle.

If it is determined that the conditions are not met for disconnecting the TC, at 406, current powertrain control strategy may be sustained. If the powertrain is operated with the torque convertor already disconnected and further disconnection of the torque convertor is not feasible, the routine may proceed to 406. In the current powertrain control strategy, the TC may be continued to be coupled or decoupled with the engine, and the current transmission gear ratio may be sustained.

If it is determined that conditions are met for TC disconnection, at 408, the TC may be disconnected by actuation of a disconnect clutch (such as torque convertor disconnect clutch 212 in FIG. 2) housed in an input shaft (such as input shaft 205 of FIG. 2) connecting the TC to the prime mover. Once the TC is disconnected, the TC may stop rotating and power from the prime mover may not be transferred to the transmission system via the TC.

At 410, the prime mover may be connected to the transmission via the direct drive unit. A direct shaft (such as the input shaft) may connect the prime mover to the direct drive unit via one of a higher range clutch (such as DH 214 in FIG. 2) and a lower range clutch (such as DL 216 in FIG. 2). Connecting the prime mover to the transmission via the direct drive unit includes at 412, engaging the DH or DL clutch to the input shaft. The selection of DH or DL may be based on vehicle speed and desired tractive effort. As an example, the DH clutch may be engaged for higher vehicle speed conditions while the DL clutch may be engaged at lower vehicle speed conditions.

At 414, the directional and range clutches may be adjusted based on vehicle operation and operator input. The directional clutches may include a forward clutch and a reverse clutch, and one of them may be engaged based on operator gear selection (if a drive gear and a reverse gear is selected by the operator in the vehicle). The range clutches may include a first range clutch, a second range clutch, and a third range clutch, one of which may be engaged based on vehicle operating conditions such as vehicle speed. As an example, at higher vehicle speeds, the third clutch may be engaged while at lower vehicle speeds, the first clutch may be engaged.

The technical effect of the torque convertor operating methods described herein is to enhance shift quality by reducing NVH. Further, the torque convertor operating methods described herein reduce losses in the torque convertor when the input to output speed variance in the torque convertor drops below a threshold value.

FIG. 5 depicts an example gear shift pathway 500 involving the torque convertor and the direct drive unit. In this example, seven gear ratios, numbered 1-7, may be attained during forward drive of the vehicle. The upshift and downshift for the gear ratio may be determined based on vehicle operation such as vehicle speed and tractive effort desired. Line 502 denotes gear change with the torque controller (TC) engaged. First dashed line 504 denotes gear change with the lower range clutch (DL) of the direct drive unit. Second dashed line 506 denotes gear change with the higher range clutch (DH) of the direct drive unit engaged. During gear changes, only one of the TC, the DL, and the DH may be engaged to connect the prime mover to the transmission.

During a shift from a first gear to a second gear, the TC may be engaged. During a shift from a second gear to a fourth gear, the DL may be engaged while the TC is disengaged. During a shift from a third gear to a fifth gear, the DH may be engaged while the TC is disengaged. During a shift from the fourth gear to a sixth gear, the DL may be engaged. During a shift from the fifth gear to a seventh gear, the DH may be engaged. It may be understood that some example gear shift pathways are shown and many more combinations are possible wherein one of the TC, DH, and DL is engaged for power transmission from the prime mover to the transmission.

In this way, by including a direct drive unit and a disconnect mechanism for the torque convertor, it is possible to selectively disconnect the torque convertor and directly connect the engine to the transmission via the direct drive unit, thereby improving efficiency of the powertrain during certain operating conditions. Further, by including lower speed and higher speed pathways within the direct drive unit, the gear options available for both forward and reverse drive modes may be increased.

In one example, a method for a vehicle, comprises: a prime mover configured to be selectively coupled to a transmission via each of a torque convertor and a direct drive unit, the direct drive unit including a higher range clutch and a lower range clutch. In the preceding example, the method further comprising, additionally or optionally, an input shaft of the transmission connecting each of the torque convertor and the direct drive unit to the prime mover. In any or all of the preceding examples, the method further comprising, additionally or optionally, a torque convertor disconnect clutch housed in the input shaft, the torque convertor disconnect clutch configured to selectively decouple the torque convertor from the prime mover. In any or all of the preceding examples, additionally or optionally, the transmission includes directional clutches and range clutches configured to be coupled to one of the torque convertor, the higher range clutch, and the lower range clutch. In any or all of the preceding examples, additionally or optionally, the directional clutches include a forward clutch and a reverse clutch, and wherein the range clutches include a first clutch, a second clutch, and a third clutch. In any or all of the preceding examples, additionally or optionally, the direct drive unit is coupled to the input shaft between the directional clutches and the range clutches. In any or all of the preceding examples, additionally or optionally, the range clutches are coupled to an output shaft of the transmission, the output shaft connecting the transmission to a differential. In any or all of the preceding examples, additionally or optionally, the prime mover is one or both of an engine and an electric motor.

In another example, a system for a vehicle, comprises: during a first condition, connecting an engine to a transmission via a torque convertor, and during a second condition, decoupling the torque convertor and connecting the engine to the transmission via a direct drive unit including a higher range clutch and a lower range clutch. In any or all of the preceding examples, additionally or optionally, the first condition includes a vehicle start and a higher than threshold desire for tractive effort, and wherein the second condition includes a speed variance between two opposing rotational interfaces of the torque convertor being smaller than a threshold value, the two opposing rotational interfaces coupled to the engine and the transmission, respectively. In any or all of the preceding examples, additionally or optionally, during the second condition, one of the higher range clutch and the lower range clutch is connected to an input shaft of the transmission. In any or all of the preceding examples, additionally or optionally, the higher range clutch is connected to the input shaft during a higher than threshold vehicle speed condition and the lower range clutch is connected to the input shaft during a lower than threshold vehicle speed condition. In any or all of the preceding examples, additionally or optionally, the transmission includes a first set of directional clutches and a second set of range clutches positioned downstream of the first set of directional clutches. In any or all of the preceding examples, additionally or optionally, the directional clutches include a forward clutch and a reverse clutch, and wherein the range clutches include a plurality of clutches. In any or all of the preceding examples, additionally or optionally, during the first condition, the torque convertor is connected to one of the forward clutch and the reverse clutch, and the one of the forward clutch and the reverse clutch connected to the torque convertor is connected to one of the range clutches. In any or all of the preceding examples, additionally or optionally, during the second condition, the one of higher range clutch and the lower range clutch connected to the input shaft of the transmission is connected to one of the forward clutch and the reverse clutch, and the one of the forward clutch and the reverse clutch connected to the direct drive unit is connected to one of the range clutches. In any or all of the preceding examples, additionally or optionally, the decoupling the torque convertor is via a disconnect clutch connected to the input shaft between the engine and the transmission.

In yet another example, a method for a vehicle, comprises: an engine, a transmission including directional clutches and range clutches, a torque convertor configured to selectively connect the engine to the transmission via a disconnect clutch; and a direct drive unit configured to selectively connect the engine to the transmission via one of a higher range clutch and a lower range clutch. Any of the preceding examples, further comprising, additionally or optionally, a controller including executable instructions stored in non-transitory memory that, when executed, cause the controller to: upon conditions being met for torque convertor disengagement, decouple the engine from the torque convertor by actuation of the disconnect clutch, and engage one of the higher range clutch and the lower range clutch of the direct drive unit to the engine. In any or all of the preceding examples, additionally or optionally, the conditions for torque convertor disengagement include a difference between an input speed and an output speed of the torque convertor being less than a threshold.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. As such, while various embodiments have been described above, it should be understood that they have been presented by way of example, and not limitation and the embodiments described above are therefore to be considered in all respects as illustrative, not restrictive. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein. As such, persons skilled in the relevant arts that the disclosed subject matter may be embodied in other specific forms without departing from the spirit of the subject matter.

As used herein, the terms "approximately" and "substantially" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a prime mover configured to selectively couple to a transmission via each of a torque converter and a direct drive unit, wherein the direct drive unit includes a higher range clutch and a lower range clutch;
a set of directional clutches rotationally coupled to the torque converter; and
a set of range clutches rotationally coupled to and positioned downstream from the set of directional clutches.

2. The system of claim 1, wherein the set of directional clutches includes a forward clutch and a reverse clutch.

3. The system of claim 1, wherein the set of range clutches includes a first range clutch, a second range clutch, and a third range clutch.

4. The system of claim 1, wherein the range clutches are coupled to an output shaft of the transmission and the output shaft connects the transmission to a differential.

5. The system of claim 1, wherein one of the range clutches in the set of range clutches is arranged coaxial to an output shaft.

6. The system of claim 1, further comprising a controller that includes instructions that when executed cause the controller to:
during a first condition, connect the prime mover to the transmission via the torque converter; and
during a second condition, decouple the torque converter and connecting the prime mover to the transmission via the direct drive unit.

7. The system of claim 6, wherein:
the first condition includes a vehicle start and a higher than threshold desire for tractive effort; and
the second condition includes a speed variance between two opposing rotational interfaces of the torque converter being smaller than a threshold value, the two opposing rotational interfaces coupled to the prime mover and the transmission, respectively.

8. The system of claim 6, wherein during the second condition, one of the higher range clutch and the lower range clutch is connected to an input shaft of the transmission.

9. The system of claim 8, wherein the higher range clutch is connected to the input shaft during a higher than threshold vehicle speed condition and the lower range clutch is connected to the input shaft during a lower than threshold vehicle speed condition.

10. The system of claim 1, wherein the prime mover is an internal combustion engine.

11. The system of claim 1, wherein the prime mover is an electric motor.

12. The system of claim 1, wherein the set of range clutches are friction clutches.

13. A transmission system comprising:
an engine configured to selectively couple to a transmission via each of a torque converter and a direct drive unit, wherein the direct drive unit includes a higher range clutch and a lower range clutch;
a set of directional clutches rotationally coupled to and positioned downstream of the torque converter; and
a set of range clutches rotationally coupled to and positioned downstream from the set of directional clutches;
wherein the set of directional clutches includes a forward clutch and a reverse clutch.

14. The transmission system of claim 13, further comprising a controller that includes instructions that when executed cause the controller to:
during a first condition, connect the engine to the transmission via the torque converter; and
during a second condition, decouple the torque converter and connecting the engine to the transmission via the direct drive unit.

15. The transmission system of claim 14, wherein during the first condition, the torque converter is connected to one of the forward clutch and the reverse clutch, and the one of the forward clutch and the reverse clutch connected to the torque converter is connected to one of the range clutches.

16. The transmission system of claim 14, wherein during the second condition, the one of higher range clutch and the lower range clutch connected to an input shaft of the transmission is connected to one of the forward clutch and the reverse clutch, and the one of the forward clutch and the reverse clutch connected to the direct drive unit is connected to one of the range clutches.

17. The transmission system of claim 13, wherein the range clutches include at least three clutches and at least one of the at least three clutches is positioned coaxial to an output shaft.

18. The transmission system of claim 17, wherein the output shaft is rotationally coupled to a differential.

19. The transmission system of claim 13, further comprising a controller including executable instructions that when executed cause the controller to:
upon conditions being met for torque converter disengagement, decouple the engine from the torque converter by actuation of the disconnect clutch, and engage one of the higher range clutch and the lower range clutch of the direct drive unit to the engine.

20. The transmission system of claim 19, wherein the conditions for torque converter disengagement include a difference between an input speed and an output speed of the torque converter being less than a threshold.

* * * * *